United States Patent
Nemoto

(10) Patent No.: US 12,504,505 B2
(45) Date of Patent: Dec. 23, 2025

(54) RADAR SYSTEM, DETECTION RESULT DISPLAY METHOD, AND RADAR DEVICE

(71) Applicant: HITACHI KOKUSAI ELECTRIC INC., Tokyo (JP)

(72) Inventor: Takeru Nemoto, Tokyo (JP)

(73) Assignee: KOKUSAI DENKI Electric Inc., Tokyo (JP)

( * ) Notice: Subject to any disclaimer, the term of this patent is extended or adjusted under 35 U.S.C. 154(b) by 0 days.

(21) Appl. No.: 18/708,623

(22) PCT Filed: Nov. 9, 2022

(86) PCT No.: PCT/JP2022/041655
§ 371 (c)(1),
(2) Date: Dec. 26, 2024

(87) PCT Pub. No.: WO2023/095609
PCT Pub. Date: Jun. 1, 2023

(65) Prior Publication Data
US 2025/0116753 A1    Apr. 10, 2025

(30) Foreign Application Priority Data
Nov. 25, 2021   (JP) ................. 2021-190794

(51) Int. Cl.
*G01S 7/22* (2006.01)
*G01S 13/87* (2006.01)

(52) U.S. Cl.
CPC ............. *G01S 7/22* (2013.01); *G01S 13/87* (2013.01)

(58) Field of Classification Search
CPC ........ G01S 13/931; G01S 13/89; G01S 13/87; G01S 13/91; G01S 7/12; G06V 20/58; G08G 1/0116
(Continued)

(56) References Cited

U.S. PATENT DOCUMENTS 6,081,764 A * 6/2000 Varon ............... G01S 13/91
342/36
6,643,580 B1 * 11/2003 Naimer ............... G08G 5/32
340/963
(Continued)

FOREIGN PATENT DOCUMENTS

JP    5-297132 A    11/1993
JP    1996-313617 A    11/1996
(Continued)

OTHER PUBLICATIONS

International Search Report dated Dec. 27, 2022.
(Continued)

*Primary Examiner* — Michael W Justice
(74) *Attorney, Agent, or Firm* — BACON & THOMAS, PLLC

(57) ABSTRACT

A radar system comprises a plurality of radar devices that detect an object by monitoring different areas. Each of the plurality of radar devices includes a display device. When the object is detected by any one of the plurality of radar devices, a display device of a first radar device that has detected the object produces a display indicating that the object has been detected, and a display device of a second radar device different from the first radar device produces a display indicating a position of the first radar device.

8 Claims, 3 Drawing Sheets

(58) Field of Classification Search
USPC .......................................... 342/179, 59, 70
See application file for complete search history.

(56) References Cited

U.S. PATENT DOCUMENTS

| | | | | |
|---|---|---|---|---|
| 6,816,780 | B2* | 11/2004 | Naimer | G08G 5/34 |
| | | | | 340/963 |
| 7,307,578 | B2* | 12/2007 | Blaskovich | G08G 5/25 |
| | | | | 342/29 |
| 7,495,601 | B2* | 2/2009 | Blaskovich | G08G 5/25 |
| | | | | 342/29 |
| 7,840,355 | B2* | 11/2010 | Breed | G08G 1/167 |
| | | | | 701/472 |
| 7,868,817 | B2* | 1/2011 | Meyers | G01S 13/933 |
| | | | | 342/36 |
| 10,013,884 | B2* | 7/2018 | DeLuca | G08G 5/34 |
| 10,178,531 | B2* | 1/2019 | Nguyen | G08G 1/096791 |
| 10,373,490 | B2* | 8/2019 | Lee | G08G 1/0133 |
| 10,672,278 | B2* | 6/2020 | DeLuca | G08G 5/34 |
| 10,725,169 | B2* | 7/2020 | Goossen | G08G 5/21 |
| 10,836,399 | B2* | 11/2020 | Kim | B60W 40/02 |
| 11,030,896 | B2* | 6/2021 | Lee | G08G 1/091 |
| 11,403,956 | B2* | 8/2022 | Priest | G08G 5/74 |
| 11,415,689 | B2* | 8/2022 | Sequeira | G01S 13/0209 |
| 11,467,274 | B2* | 10/2022 | Sequeira | G01S 13/888 |
| 2004/0111192 | A1* | 6/2004 | Naimer | G01C 21/005 |
| | | | | 701/9 |
| 2006/0227036 | A1* | 10/2006 | Blaskovich | G08G 5/723 |
| | | | | 342/182 |
| 2007/0252749 | A1* | 11/2007 | Blaskovich | G08G 5/21 |
| | | | | 342/29 |
| 2009/0033540 | A1* | 2/2009 | Breed | G05D 1/0278 |
| | | | | 701/472 |
| 2010/0085235 | A1* | 4/2010 | Meyers | G01S 13/931 |
| | | | | 342/29 |
| 2012/0313807 | A1 | 12/2012 | Yanagi | |
| 2017/0088261 | A1* | 3/2017 | Sequeira | G01S 13/0209 |
| 2018/0033312 | A1* | 2/2018 | DeLuca | G08G 5/58 |
| 2018/0077518 | A1* | 3/2018 | Nguyen | H04W 84/00 |
| 2018/0093769 | A1* | 4/2018 | Sequeira | G01S 13/888 |
| 2018/0246200 | A1* | 8/2018 | Goossen | G01S 7/003 |
| 2018/0268716 | A1* | 9/2018 | Deluca | G08G 5/55 |
| 2018/0293885 | A1* | 10/2018 | Lee | G08G 1/091 |
| 2019/0001987 | A1* | 1/2019 | Kim | B60W 40/02 |
| 2019/0369613 | A1* | 12/2019 | Moon | G05D 1/0033 |
| 2020/0143673 | A1* | 5/2020 | Lee | G08G 1/0133 |
| 2020/0168111 | A1* | 5/2020 | Veyrac | G01S 13/42 |
| 2020/0242946 | A1* | 7/2020 | Deluca | H04W 76/10 |
| 2021/0088627 | A1* | 3/2021 | Sato | G01S 7/4026 |
| 2021/0190932 | A1 | 6/2021 | Sato | |

FOREIGN PATENT DOCUMENTS

| | | |
|---|---|---|
| JP | 2001-056372 A | 2/2001 |
| JP | 2013-002837 A | 1/2013 |
| JP | 2015-194371 A | 11/2015 |
| WO | 2018/235397 A1 | 12/2018 |
| WO | 2021/059340 A1 | 4/2021 |

OTHER PUBLICATIONS

Japanese Office Action dated Dec. 10, 2024 issued in corresponding Japanese Patent Application No. 2023-563602 and English translation thereof.

* cited by examiner

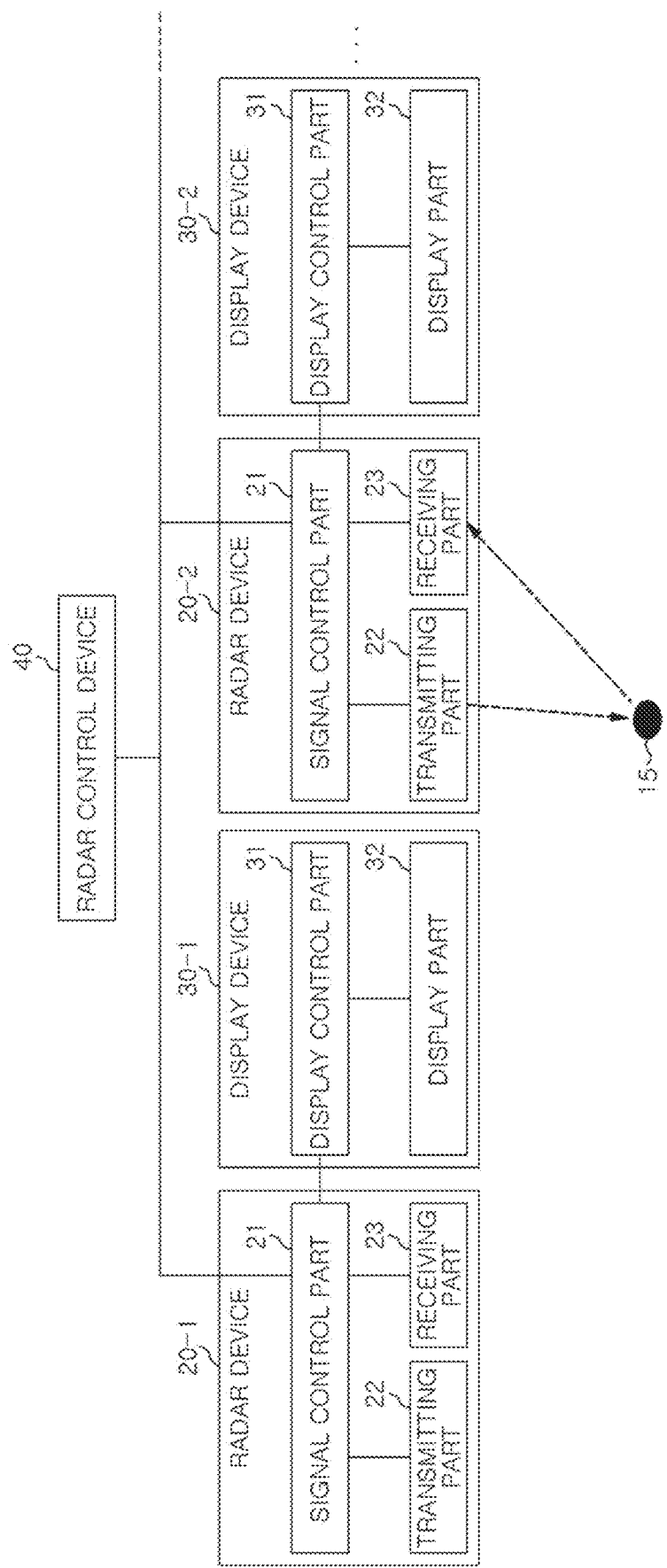

FIG.3A
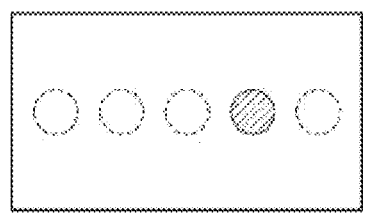
(a)
FIG.3D
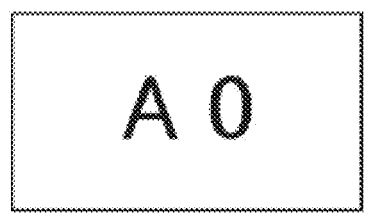
(d)
FIG.3B
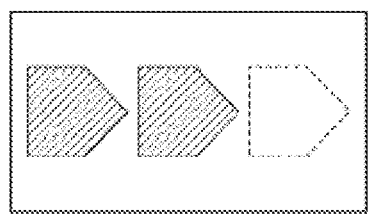
(b)
FIG.3E
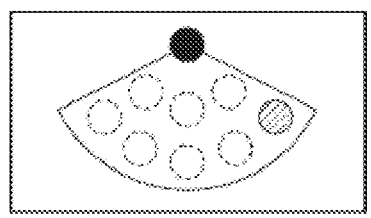
(e)
FIG.3C
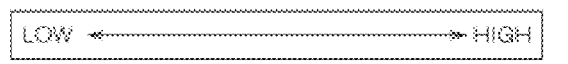
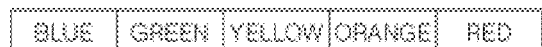
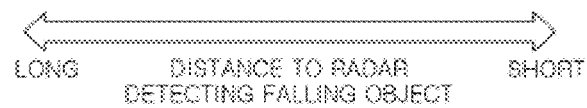

RADAR SYSTEM, DETECTION RESULT DISPLAY METHOD, AND RADAR DEVICE

TECHNICAL FIELD

The present disclosure relates to a radar system including a plurality of radar devices for detecting an object by monitoring different areas.

BACKGROUND

Conventionally, a radar device for detecting an object existing in a monitoring area based on reception results of reflected waves with respect to transmitted waves have been practically used. The radar device is used, e.g., for detecting an object such as an obstacle or a falling object at work sites, grounds, inside facilities, parking lots, roads, railroad tracks, runways, and the like. Such a radar device may be, e.g., a frequency modulated continuous-wave (FMCW) radar device using microwave or millimeter wave bands.

Prior arts in the technical field related to the present disclosure includes the following. For example, Patent Document 1 discloses an invention that supports a monitoring operation of an operator in charge of monitoring a specific monitoring area. Patent Document 2 discloses an invention for protecting a receiving circuit of a radar device from input of an excessive reflected received power. Patent Document 3 discloses an invention that supports an operator in efficiently finding an object detected by a radar device.

PRIOR ART DOCUMENTS

Patent Documents

Patent document 1: Japanese Laid-open Patent Publication No. 2015-194371
Patent Document 2: International Publication No. 2018/235397
Patent Document 3: International Publication No. 2021/059340

SUMMARY

Problems to Be Resolved by the Invention

For example, a radar system including a plurality of radar devices is constructed to monitor a wide area such as a runway. In accordance with the radar system, it is possible to measure a position of a detected object in a wide area with a certain degree of accuracy. When an object to be removed is detected by the radar system, an operator of a management company or the like removes the detected object. In order to quickly complete the operation, an operator searches for a detected object while driving a car and using a map of a monitoring area based on location information of the detected object obtained from the radar system. In this case, for example, the map is displayed on a portable terminal such as a tablet or the like, and a location where the detected object exists is highlighted.

However, in the case of performing a search operation using a portable terminal such as a tablet or the like, a long period of time is required to find an object to be searched in a wide area with no landmarks. Further, an operator needs to perform a search operation while looking at the display on a portable terminal, which was dangerous for the operator. The search operation may be performed after sunset when there is little sunlight as well as daytime. Under such dim conditions, it was even more difficult to search for a small object to be searched.

The present disclosure has been made in view of the conventional problems, and the object of the present disclosure is to provide a technique that facilitates searching of an objected detected in a wide area using a radar system including a plurality of radar devices.

Means for Solving the Problems

In order to achieve the object, a radar system according to one aspect of the present disclosure is configured as follows. That is, the radar system according to the present disclosure comprises a plurality of radar devices that detect an object by monitoring different areas, wherein each of the plurality of radar devices includes a display device, and when the object is detected by any one of the plurality of radar devices, a display device of a first radar device that has detected the object produces a display indicating that the object has been detected, and a display device of a second radar device different from the first radar device produces a display indicating a position of the first radar device.

According to the radar system of the present disclosure, the display indicating the position of the first radar device includes a display indicating a direction of the first radar device with respect to the second radar device.

Further, according to the radar system of the present disclosure, the display indicating the position of the first radar device includes a display indicating a distance from the second radar device to the first radar device.

Further, according to the radar system of the present disclosure, the display indicating the position of the first radar device is a display indicating coordinates of the first radar device.

Further, according to the radar system of the present disclosure, the display indicating that the object has been detected is a display indicating coordinates at which the object was detected.

Further, according to the radar system of the present disclosure, the display indicating that the object has been detected is a display in which the position of the object is superimposed on a map indicating an area monitored by the first radar device.

A detection result display method according to another aspect of the present disclosure is configured as follows. That is, the detection result display method using a radar system including a plurality of radar devices that detect an object by monitoring different areas, wherein each of the plurality of radar devices includes a display device, and when the object is detected by any one of the plurality of radar devices, a display device of a first radar device that has detected the object produces a display indicating that the object has been detected, and a display device of a second radar device different from the first radar device produces a display indicating a position of the first radar device.

A radar device according to another aspect of the present disclosure is configured as follows. That is, the radar device for detecting an object that is used together with another radar device that monitors a different area, comprises a display device that produces a display indicating that an object has been detected when the object is detected by the radar device.

Further, the radar device according to another aspect of the present disclosure is configured as follows. That is, the radar device for detecting an object that is used together with another radar device that monitors a different area, comprises a display device that produces a display indicating the position of said another radar device that has detected the object when the object is detected by said another radar device.

Effect of the Invention

In accordance with the present disclosure, it becomes easier to search for an object detected in a wide area using a radar system including a plurality of radar devices.

BRIEF DESCRIPTION OF THE DRAWINGS

FIG. 2 shows an example of functional blocks of the radar system of FIG. 1.

FIGS. 3A to 3E show examples of display on a display device of the radar system of FIG. 1.

DETAILED DESCRIPTION

Figure 1:
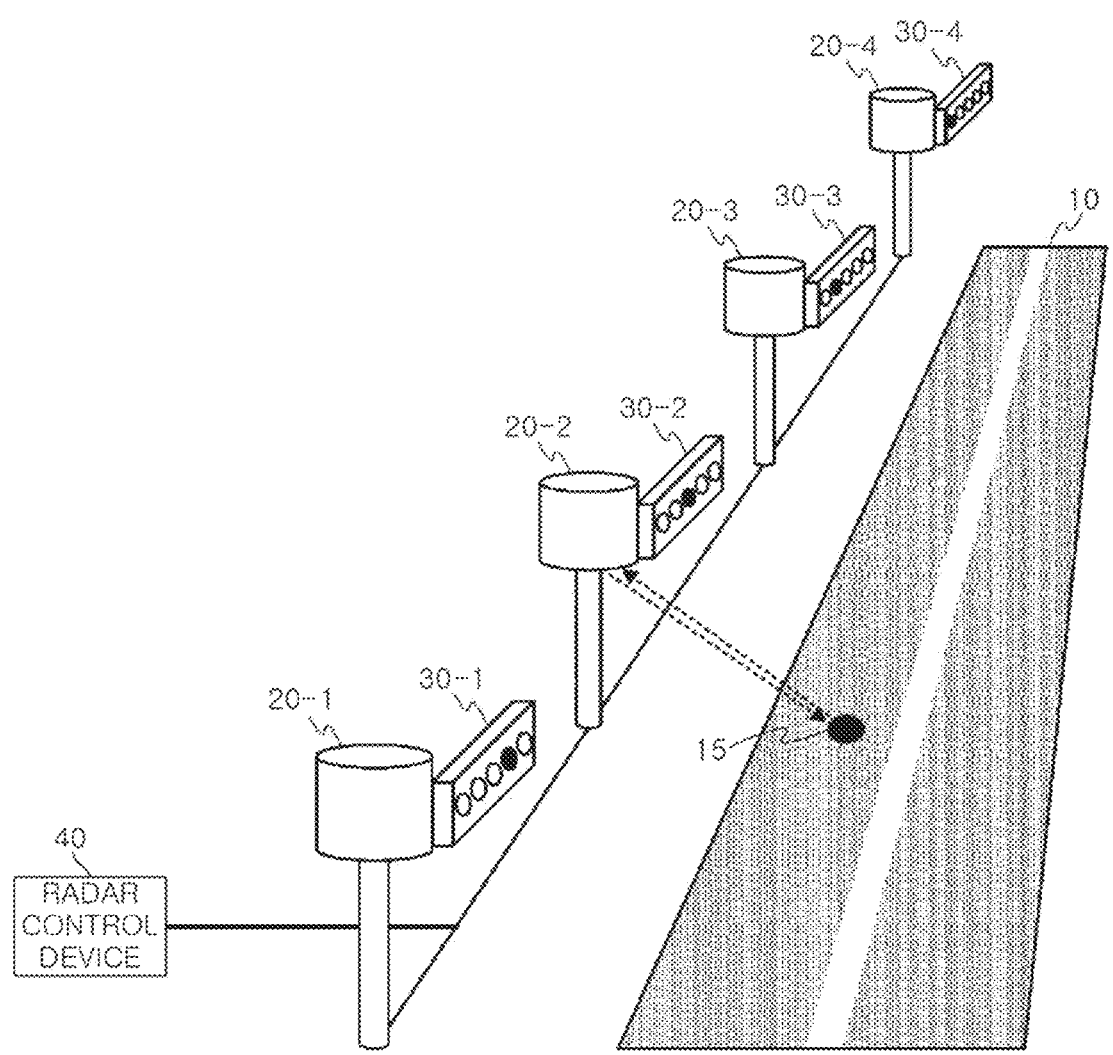
FIG. 1 shows an outline of a radar system according to an embodiment of the present disclosure.

An embodiment of the present disclosure will be described with reference to the accompanying drawings. FIG. 1 shows an outline of a radar system according to an embodiment of the present disclosure. The radar system of this example is a system for detecting and removing an object 15 such as an obstacle and a falling object existing in a monitoring area 10. In this example, the monitoring area 10 is divided into a plurality of areas (not shown), and a radar device 20 is installed in each area. In other words, different areas as monitoring areas are assigned for the radar devices 20. Each of the radar devices 20 detects an object existing in its own monitoring area under the control of a radar control device 40 that is connected to the radar device 20 to be communicable therewith.

In FIG. 1, four radar devices 20-1, 20-2, 20-3, and 20-4 are installed along the longitudinal direction of the monitoring area 10. However, the number of the radar devices 20 is not limited thereto. Further, in FIG. 1, the radar devices 20 are installed only on one side of the monitoring area 10 in the longitudinal direction. However, the radar devices 20 may be installed on both sides of the monitoring area 10.

Each of the plurality of radar devices 20 has a display device 30 having a function of displaying various information. In FIG. 1, a display device 30-1 is attached to the right side of the main body of the radar device 20-1. Similarly, display devices 30-2, 30-3, and 30-4 are attached to the right sides of the main bodies of the radar devices 20-2, 20-3, and 20-4, respectively. The attaching position of the display device 30 is not limited thereto, and the display device 30 may be attached to other positions such as the left side, the upper side, or the lower side of the radar device 20. Further, instead of directly attaching the display device 30 to the radar device 20, the display device 30 may be installed at a position slightly distant from the radar device 20. In other words, the arrangement of the display device 30 is not particularly limited as long as the relationship between the pair of the radar device 20 and the display device 30 can be easily recognized and the display contents can be easily checked.

The display device 30 displays the detection result of the object. For example, when the object 15 is detected by the radar device 20-2, the display device 30-2 of the radar device 20-2 produces a display indicating that the object 15 has been detected. In this case, the display devices 30-1, 30-3, and 30-4 of the other radar devices 20-1, 20-3, and 20-4 display the position of the radar device 20-2 that detected the object 15. In other words, the display device 30 of the other radar device 20 produces a display for guiding an operator toward the radar device 20 that has detected the object 15. Hereinafter, the structure thereof will be described.

FIG. 2 shows an example of functional blocks of the radar system of FIG. 1. In FIG. 2, the radar devices 20-3 and 20-4 and the display devices 30-3 and 30-4 are omitted for simplicity of description. Each radar device 20 has a signal control part 21, a transmitting part 22, and a receiving part 23. Further, each display device 30 has a display control part 31 and a display part 32.

In the radar device 20, the signal control part 21 generates a radar signal of a predetermined frequency, supplies it to the transmitting part 22, and causes the transmitting part 22 to output radar transmission waves toward a monitoring area. When the object 15 exists in the monitoring area, the radar transmission waves are reflected by the object 15. The reflected waves from the object 15 are received by the receiving part 23 of the radar device 20 and subjected to signal processing by the signal control part 21. As a result, the object 15 existing in the monitoring area is detected. Further, in order to specify the detection position of the object 15, the distance or the orientation from the radar device 20 to the object 15 is also measured. The operating principle or the usage frequency of the radar device 20 is not particularly limited.

When the object 15 existing in the monitoring area is detected, the radar device 20 transmits object detection information to its own display device 30, and also transmits the object detection information to the display devices 30 of other radar devices 20 through the radar control device 40. In other words, the object detection information is transmitted to all the display devices 30 in the system. The object detection information includes radar identification information (e.g., radar number) for identifying the radar device 20 that has detected the object 15 and object detection position information indicating the detection position of the object 15.

The display device 30 determines display contents based on the object detection information under the control of the display control part 31, and causes the display part 32 to display the detection result of the object. The display part 32 is configured using, e.g., a light emitting diode (LED) display. Here, it is assumed that the display device 30 stores in advance the radar identification information for identifying the radar device 20 having a pair relationship therewith in a memory. Hereinafter, the display on the display device 30-2 having a pair relationship with the radar device 20-2, and the display on the display device 30-1 that is an example of another display device in the case where the radar device 20-2 detects the object 15, for example, will be described.

When the radar identification information included in the object detection information is the same as the previously stored radar identification information, the display control part 31 of the display device 30-2 recognizes that the radar device of the transmission source of the object detection information has a pair relationship with its own device, and causes the display part 32 to produce a display indicating that the object 15 has been detected. In this case, the display control part 31 of the display device 30-2 may produce a display indicating the position of the object 15 in the monitoring area of the radar device 20-2 (for example, display shown in FIG. 3D or 3E) on the display part 32 based on the object detection position information included in the object detection information. On the other hand, when the radar identification information included in the object detection information is not the same as the previously stored radar identification information, the display control part 31 of the display device 30-1 recognizes that the radar device of the transmission source of the object detection information does not have a pair relationship with its own device, and causes the display part 32 to produce a display indicating the position of the radar device 20-2 that has detected the object 15 (for example, display shown in FIG. 3A or 3B).

The type of display displayed by the display device 30 of each radar device 20 can be determined based on the positional relationship between the radar device 20 that performs the display operation and the radar device 20 that has detected the object 15. For example, the display pattern data in which the type of display produced by the display device 30 of the radar device 20 that has detected the object 15 and the type of display produced by the display device 30 of another radar devices 20 are determined is prepared in advance, and the display mode of the display device 30 of each radar device 20 can be determined based on the display pattern data.

FIGS. 3A to 3E show examples of display by the display device 30. FIG. 3A shows a display example in which five circular indicating lamps are arranged in a horizontal direction. In the display device 30 of the radar device 20 that has detected the object 15 (for example, the display device 30-2 of the radar device 20-2), the central indicating lamp is turned on. In this case, in the display device 30 of the radar device 20 adjacent to the left side of the radar device that detected the object (for example, the display device 30-1 of the radar device 20-1), the indicating lamp immediately on the right side from the center is turned on. Further, in the display device 30 of the radar device 20 located on the further left side thereof, the rightmost indicating lamp is turned on. Further, in the display device 30 of the radar device 20 adjacent to the right side of the radar device that detected the object (for example, the display device 30-3 of the radar device 20-3), the indicating lamp immediately on the left side from the center is turned on. Further, in the display device 30 of the radar device 20 located on the further right side thereof (for example, the display device 30-4 of the radar device 20-4), the leftmost indicating lamp is turned on. In other words, in FIG. 3A, as the display device is closer to the radar device 20 that detected the object 15, the indicating lamp closer to the center is turned on. In this manner, by visually expressing the direction and the distance of the radar device 20 that has detected the object 15, it is possible to guide an operator toward the radar device 20 that has detected the object 15.

FIG. 3B shows an example of display using an arrow-shaped indicating lamp. In the other radar devices 20 that have not detected the object 15, pentagonal arrow-shaped indicating lamps indicating the direction of the radar device 20 that has detected the object 15 are turned on. In FIG. 3B, the rightward arrow-shaped indicating lamp is turned on to indicate that the radar device 20 that has detected the object 15 exists on the right side when viewed from the radar device 20 having the display device 30 that produces the display. Further, as shown in FIG. 3B, the distance to the radar device 20 that has detected the object 15 may be expressed by changing the number of arrow-shaped indicating lamps that are turned on.

FIG. 3C shows an example in which the distance to the radar device 20 that has detected the object 15 is expressed by the number of flickering of the indicating lamp or by the display color. For example, the distance to the radar device 20 that has detected the object 15 can be expressed by gradually increasing the number of flickering of the indicating lamp as the distance to the radar device 20 that has detected the object 15 becomes shorter. Further, for example, the distance to the radar device 20 that has detected the object 15 can be expressed by changing the display color of the indicating lamp to blue, green, yellow, orange, and red as the distance to the radar device 20 that has detected the object 15 becomes shorter. Since the display method of FIG. 3C cannot express the direction of the radar device 20 that has detected the object 15, it may be combined with the display method of FIG. 3A or 3B.

FIG. 3D shows an example of display in the case where the monitoring area 10 is divided into a plurality of blocks, and coordinate IDs are assigned to the blocks to manage them. In this case, both the radar device 20 that has detected the object 15 and the other radar devices 20 that have not detected the object 15 may display the coordinate ID of the block where the object 15 was detected. The display of the coordinate ID indicates that the object 15 has been detected, indicates the position of the radar device 20 that has detected the object 15, and indicates the detection position of the object 15. Only the radar device 20 that has detected the object 15 may display the coordinate ID shown in FIG. 3D, and the other radar devices 20 may produce displays shown in FIGS. 3A to 3C.

FIG. 3E shows an example of display of the radar device 20 that has detected the object 15, and illustrates the position of the object 15 in the monitoring area of the radar device 20. In FIG. 3E, the position (circular mark) of the object 15 is superimposed on a map showing the monitoring area of the radar device 20. Due to such a display, an operator who has arrived at the monitoring area of the radar device 20 that has detected the object 15 can visually recognize the position of the object 15 easily.

As described above, the radar system of this example includes the plurality of radar devices 20 for detecting an object by monitoring different areas. Each of the plurality of radar devices 20 includes the display device 30. When the object 15 is detected by any one of the plurality of radar devices 20, the display device 30 of the radar device 20 that has detected the object 15 (for example, the display device 30-2 of the radar device 20-2) displays the detection of the object 15. The display device 30 of another radar device 20 (for example, the display device 30-1 of the radar device 20-1) displays the position of the radar device 20 that detected the object 15.

With such a configuration, an operator who is in charge of removing a detected object can quickly move toward the monitoring area of the radar device that has detected the object, and search for the detected object in the monitoring area. Therefore, it is easy to search for the detected object in a wide area. As a result, it is possible to quickly eliminate a state in which facilities and equipments cannot be operated normally due to the presence of an object such as an obstacle or a falling object.

Here, in the radar system of this example, each display device 30 controls its own display contents. However, the display contents of the display device 30 may be controlled by another device. For example, the radar device 20 may control the display contents of its own display device 30. Further, for example, the radar control device 40 may collectively control the display contents of the display devices 30 of all the radar devices 20.

While the embodiments of the present disclosure have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

Further, the present disclosure can be provided not only as the above-described devices and the system including those device, but also as a method performed by those devices, a program for causing a processor to execute the functions of those devices, a storage medium storing such a program in a computer-readable manner, or the like.

This application claims priority to Japanese Patent Application No. 2021-190794 filed on Nov. 25, 2021, the entire contents of which are incorporated herein by reference.

Industrial Applicability

The present disclosure can be used for a radar system including a plurality of radar devices for detecting an object by monitoring different areas.

DESCRIPTION OF REFERENCE NUMERALS

10: monitoring area, 15: object, 20 (20-1, 20-2, 20-3, 20-4): radar device, 21: signal control part, 22: transmitting part, 23: receiving part, 30 (30-1, 30-2, 30-3, 30-4): display device, 31: display control part, 32: display part, 40: radar control device

The invention claimed is:

1. A radar system comprising a plurality of radar devices, wherein each of the plurality of radar devices is installed at a location configured to monitor a corresponding one of a plurality of monitoring areas and detects an object by monitoring the corresponding area,
each of the plurality of radar devices includes a display device, and
when the object is detected by any one of the plurality of radar devices, a display device of a first radar device that has detected the object produces a display indicating that the object has been detected, and a display device of a second radar device different from the first radar device produces a display indicating a position of the first radar device.

2. The radar system of claim 1, wherein the display indicating the position of the first radar device includes a display indicating a direction of the first radar device with respect to the second radar device.

3. The radar system of claim 2, wherein the display indicating the position of the first radar device includes a display indicating a distance from the second radar device to the first radar device.

4. The radar system of claim 1, wherein the display indicating the position of the first radar device is a display indicating coordinates of the first radar device.

5. The radar system of claim 1, wherein the display indicating that the object has been detected is a display indicating coordinates at which the object was detected.

6. The radar system of claim 1, wherein the display indicating that the object has been detected is a display in which the position of the object is superimposed on a map indicating an area monitored by the first radar device.

7. A detection result display method using a radar system including a plurality of radar devices that detect an object by monitoring different areas,
wherein each of the plurality of radar devices is installed at a location configured to monitor a corresponding one of a plurality of monitoring areas and detects an object by monitoring the corresponding area,
each of the plurality of radar devices includes a display device, and
when the object is detected by any one of the plurality of radar devices, a display device of a first radar device that has detected the object produces a display indicating that the object has been detected, and a display device of a second radar device different from the first radar device produces a display indicating a position of the first radar device.

8. A radar device for detecting an object that is used together with another radar device, the radar device being installed at a location configured to monitor a corresponding monitoring area and detecting an object by monitoring the corresponding area, comprising:
a display device that produces a display indicating that an object has been detected when the object is detected by the radar device;
wherein the display device produces a display indicating the position of said another radar device that has detected the object when the object is detected by said another radar device.

* * * * *